Figure 1:
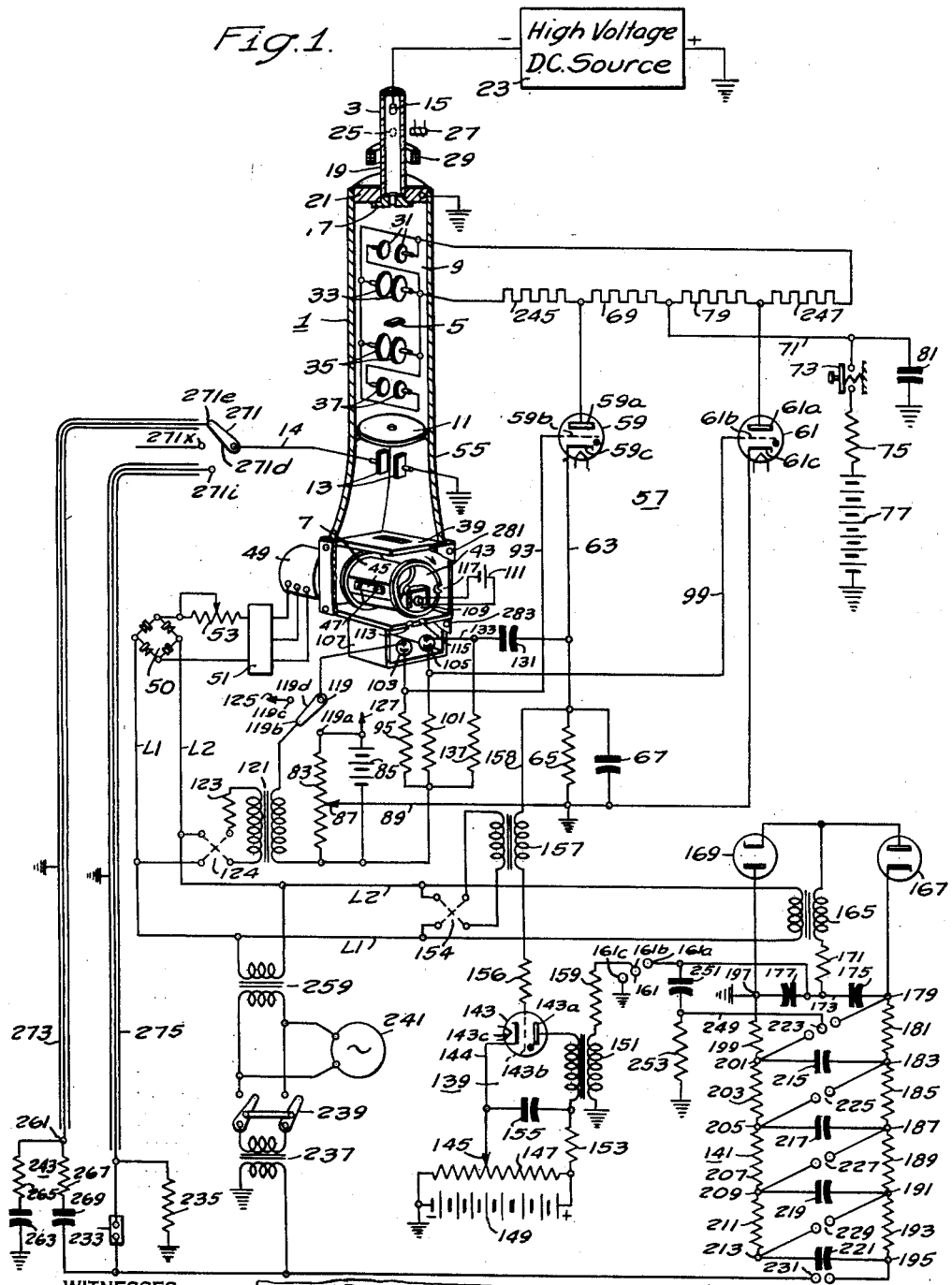

July 18, 1950 A. M. OPSAHL 2,516,015
RECORDING OSCILLOGRAPH
Filed May 21, 1947

WITNESSES:
E. A. McCloskey
Arthur S. Stewart

INVENTOR
Alert M. Opsahl.
BY L. L. Freedman
ATTORNEY

Patented July 18, 1950

2,516,015

UNITED STATES PATENT OFFICE 2,516,015

RECORDING OSCILLOGRAPH

Alert M. Opsahl, Pittsburgh, Pa., assignor to Westinghouse Electric Corporation, East Pittsburgh, Pa., a corporation of Pennsylvania Application May 21, 1947, Serial No. 749,475

14 Claims. (Cl. 346—33)

This invention relates to electronic systems and more particularly to electronic control systems for electronic oscillographs of the type producing a record on a moving surface.

In accordance with the invention, an electronic control system is provided which is responsive to two conditions for producing two or more controlling actions. Such an electronic control system is particularly suitable for controlling an electronic oscillograph of the type producing a record on a moving or rotating recording surface and will be described with reference to such an oscillograph.

A cathode ray oscillograph of the type hereinafter described comprises a recording surface, such as a photographic film or other sensitized material, an electron gun for generating an electron beam, and means for directing the beam.

The electron beam is intercepted by a barrier or target placed between the electron gun and recording surface. By means of a relay, the beam is deflected to pass the target and to continue in its original direction toward the recording surface. Another deflecting means is positioned between the recording surface and the target to deflect the electron beam in accordance with some phenomenon to be studied.

To produce a time axis, the recording surface is moved relative to the beam. To move the recording surface at a constant speed and to employ a film of rather short length, it has been found advantageous to position the film or recording surface on the periphery of a rotating drum.

If the recording surface rotates continuously while the electron beam impinges thereon, the record formed on the surface may continue for several rotations of the surface. Such a record may have numerous overlapping portions which are extremely difficult to analyze.

In accordance with the invention, the electron beam of an oscillograph is permitted to form a record on the recording surface only for a predetermined movement of the recording surface, such as one revolution thereof. The resulting record readily may be analyzed.

The invention contemplates the provision of an electronic control system which is responsive to a predetermined position of the recording surface for activating the oscillograph to permit the electron beam to impinge on the recording surface. The electronic control system is responsive to a predetermined movement of the recording surface, such as one revolution thereof, to terminate the production of a record on the recording surface.

In a preferred embodiment of the invention, the electronic control system comprises a pair of electronic tubes, one of which is responsive to a predetermined position of the recording surface for initiating the production of a record thereon. After initiation of the record production, the electronic control system locks in to permit continuation of the recording for a predetermined movement of the recording surface, such as one revolution thereof. At this time, the electronic control system terminates production of the record until the system is reset for a further operation. It will be noted that the electronic control system is designed to lock in after initiation of a recording operation and to effect continuation of the recording operation until the formation of the record is completed. The electronic control system then locks out until it is reset. The lock-in and lock-out of the electronic control system are obtained in a preferred embodiment of the invention by employing electronic tubes of the gaseous discharge type.

By employing an improved electronic control system, the recording operation is continued, without interruption, until the recording is completed. The improved system does not require critical adjustments and is not affected by the length of certain leads and any electrical charges that may accumulate on the leads.

In connection with the use of an oscillograph employing such a system, it has been found desirable to have the recording begin at a particular time with reference to a predetermined or known instantaneity, happening or periodic pulse. By being able to associate the time axis of the recording with a reference time interval, the recording can convey information as to time relationships not heretofore available.

As another improvement in the art, it is desirable to initiate a phenomenon to be recorded, such as a transient phenomenon, at a particular time with reference to the initiation of the recording. This is accomplished by a control system which has means for both initiating the recording and initiating the phenomenon to be recorded.

It is, therefore, an object of the invention to provide an improved electronic system including an oscillograph for producing a record on a moving recording surface, and electronic control means for controlling the initiation and termination of the record production.

It is a further object of the invention to provide an improved electronic control system responsive to a pair of conditions for producing separate locked controlling operations.

It is an additional object of the invention to provide a control system which will initiate a recording at a predetermined position of the recording surface and at a particular or determinable time.

It is still a further object of the invention to provide a control system which will initiate the recording at a predetermined position of the recording surface and which will also initiate, in a definite time relationship with the initiation of the recording, a phenomenon to be recorded.

Figure 2:
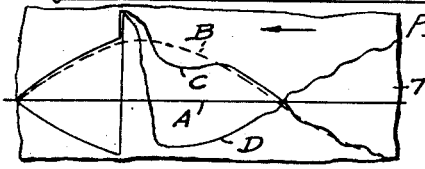

Other objects of the invention will be apparent from the following description, taken in conjunction with the accompanying drawing, in which:

Figure 1 is a schematic view with parts in perspective and parts broken away, of an electronic system embodying the invention; and Fig. 2 is a diagrammatic view of a record produced by the system of Fig. 1.

Referring to the drawing, Figure 1 shows an electronic oscillograph, which may be of any suitable construction. In Fig. 1, a cold cathode oscillograph 1 is disclosed which includes an electronic gun 3 capable of producing an electron beam. The electron beam is directed against a target or barrier 5 which prevents the beam from impinging on a recording surface 7. To permit the electron beam to reach the recording surface 7, a deflecting electrode system, referred to in the art as a relay 9, is provided for deflecting or bending the electron beam around the target 5. As a result of this bending, the electron beam passes through an opening in the diaphragm 11 to impinge on the recording surface 7. Suitable deflecting means, such as a pair of deflecting plates 13 are provided for deflecting the electronic beam when suitably energized in accordance with a phenomenon to be studied.

The electron gun 3 may include a cathode 15 formed of suitable material, such as aluminum, and an anode 17 which may be constructed of silver. The cathode and anode are spaced by means of an insulating tube of glass 19. The anode 17 is secured to an electroconductive disc 21 which forms part of the container of the oscillograph. This disc 21 is grounded. By inspection of Fig. 1, it will be noted that the cathode 15 is connected to the negative terminal of a direct-current high-voltage source 23, and the positive terminal of the source is grounded.

In order to control the electron beam, suitable deflecting and focusing coils may be associated with the oscillograph, as desired. For example, in Fig. 1, a pair of deflecting coils 25 and 27 are disposed at right angles to each other adjacent the path of the electron beam in the gun 3. In addition, a focusing coil 29 surrounds the electron gun 3. As is well understood in the art, direct current may be passed through the coils 25 and 27 for the purpose of centering the electron beam in the electron gun. Also, as is well understood in the art, direct current may be passed through the focusing coil 29 for the purpose of focusing the electrons into a compact well-defined beam.

As previously pointed out, the electron beam formed by the gun is directed against a target 5. However, when the relay 9 is suitably energized, the electron beam is bent around the target 5 and directed through an opening in the diaphragm 11. It will be noted that the relay 9 includes pairs of deflecting plates 31, 33, 35 and 37, and a common voltage is applied across the pairs of deflecting plates. As the electron beam passes between the plates 31, it is deffected by the field between the plates 31 away from the axis of the oscillograph in order that the beam may pass the target 5. However, the field between the plates 33 is reversed relative to that between plates 31. Consequently, as the electron beam passes between the plates 33, the field between these plates begins to return the electron beam toward the axis of the oscillograph. This action is continued by the plates 35. Finally the electron beam passes between the plates 37. These plates produce a field which is reversed relative to the field between the plates 35. The field between the plates 37 is proportioned to restore the electron beam to a path following the axis of the oscillograph and passing through an opening in the diaphragm 11. The electron beam then passes between the deflecting plates 13 and through an opening in the masking plate 39 to impinge on the recording surface 7. A voltage to be studied may be applied across the deflecting plates 13, one of the deflecting plates 13 being connected to ground.

The recording surface 7 may take the form of a sheet of photosensitive or photographic paper or film which is wrapped around a hollow drum 43. The ends of the paper may be secured to the drum 43 by means of a clamping strip 45 which is removably secured to the drum in any suitable manner as by machine screws 47. The drum may be rotated in the direction of the arrow by means of a motor 49. If desired, this motor may be a three-phase alternating-current electric motor which is energized in any suitable manner. As illustrated in Fig. 1, a sixty-cycle alternating-current voltage is supplied by conductors L1 and L2 to a conventional bridge type of full-wave rectifier 50 which supplies a direct-current voltage to an inverter 51, which may be a motor-generator set, supplying three-phase alternating current to the motor 49. To provide for a means of varying the speed of the motor 49 and the drum 43, a rheostat 53 is connected in one of the direct-current lines between the rectifier 50 and the inverter 51. By adjusting the rheostat 53, the direct-current voltage applied to the inverter 51 may be varied which, in turn, changes the frequency of the voltage supplied to the motor 49.

The essential elements of the oscillograph thus far specifically described are well known in the art. For example, reference may be made to the Norinder Patent No. 1,910,560. The relay 9, the target 5, the diaphragm 11, the deflecting plates 13, the drum 43 and the motor 49 may be located in a container 55 which is closed at one end by the gun 3. This container may be evacuated by a continuous pumping system, such as that disclosed in the Ackermann Patent No. 2,276,639.

In my copending patent application, Serial No. 563,753, filed November 16, 1944, entitled "Oscillographs," now Patent No. 2,501,352, March 21, 1950, the foregoing oscillograph is also disclosed, and is described having an electronic control system employed therewith comprising a pair of gaseous discharge tubes and a pair of photocells, which initiate and terminate the production of a recording at predetermined positions of the recording surface. Such an electronic control system is capable of restricting the formation of a record on the recording surface 7 to a predetermined movement of the drum 43, such as one revolution thereof.

Referring again to the drawing, Fig. 1 shows an electronic control system 57. The electronic control system includes an electronic tube 59 for controlling the initiation of the production of a record on the drum 43 and an electronic tube 61 for controlling the termination of the production of a record on the recording surface 7 attached to the drum 43.

The tube 59 is illustrated as having an anode 59a, a grid or control electrode 59b and a cathode 59c. The anode and cathode are main electrodes defining a path or space for current which is controlled by the control electrode or grid 59b. Similarly, the tube 61 is provided with an anode 61a, a grid or control electrode 61b, and a cathode 61c. The cathode 61c is connected to ground. The cathode 59c is connected to ground through a conductor 63 and a cathode resistor or load 65. In order that a sudden voltage rise across the cathode resistor 65 will not occur when the tube 59 becomes conductive, which would tend to create transient disturbances, a capacitor 67 is connected in parallel with the resistor 65. With this parallel arrangement, the voltage rise takes place over a period of approximately 300 microseconds. The plate 59a is connected to ground through a plate resistor 69, a conductor 71, a switch 73, a resistor 75 and a battery 77 which has its negative terminal connected to ground. The plate 61a is connected to ground through a plate resistor 79, the conductor 71, the switch 73, the resistor 75 and the battery 77. A filter capacitor 81 may be connected between the conductor 71 and ground.

Grid bias for the tubes 59 and 61 that normally renders the tubes non-conductive is provided by a potentiometer or voltage divider 83 which is connected across a voltage supply, such as a battery 85. An adjustable tap 87 is grounded through a conductor 89. The grid 59b is connected through a conductor 93 and a resistor 95 to the negative terminal of the voltage divider 83. The grid 61b is connected through a conductor 99 and a resistor 101 to the negative terminal of the voltage divider 83. Consequently, the grid 59b is biased negatively relative to the cathode 59c to an extent determined by the distance the voltage tap 87 is from the negative terminal of the voltage divider 83. The grid 61b is similarly biased negatively relative to the cathode 61c. Therefore, both of the tubes 59 and 61 are negatively biased from the same source to prevent passage of current between their main electrodes.

As a means of initiating a discharge in the tube 59, a light-sensitive or photoelectric cell 103 is employed which has its cathode connected to the conductor 93. As a means of initiating a discharge in tube 61, a light-sensitive or photoelectric cell 105 is connected between the conductors 63 and 99, the circuit being traced from the conductor 99 to the cathode of the photocell 105, and from the anode of the photoelectric cell 105 through a conductor 133 and a blocking capacitor 131 to the conductor 63. A lead resistor 137 is connected between the conductor 133 and the negative terminal of the voltage divider 83, to fix the potential of conductor 133 and to prevent a potential from accumulating on the conductor 133 during the period that the tube 59 is not discharging.

By means of a switch 119 having an arm 119d and a plurality of terminals, such as terminals 119a, 119b and 119c, a voltage may be supplied to the anode of the photoelectric cell 103 continuously, intermittently or at a designated time, respectively. By positioning the arm 119d of the switch 119 so that the anode of the photoelectric cell 103 is connected to terminal 119a and to the positive terminals of the voltage divider 83 and the battery 85, a continuous positive potential is supplied to the anode of the photoelectric cell 103. By changing the position of the arm 119d of the switch 119 to contact terminal 119b, a voltage is supplied by the secondary of a peaking transformer 121, the primary of the transformer having a resistance 123 in series therewith and being connected through a reversing switch 124 across the lines L1 and L2 which are a source of sixty-cycle alternating current. By positioning the arm 119d of the switch 119 to contact terminal 119c, potential from the battery 85 is supplied to the anode of the photoelectric cell 103 only when a circuit is closed between the leads 125 and 127. The circuit may be closed between the leads 125 and 127 at a brief interval in a timed relationship with the initiation of the phenomenon to be recorded.

The photoelectric cells 103 and 105 are disposed in an enclosure 107 which is secured to the container 55 and are capable of being illuminated once for each rotation of the drum 43. For this purpose, a light source, such as an electric lamp 109, is disposed within the drum 43 and is energized in any suitable manner as from a battery 111. Under predetermined conditions, light from the light source passes through openings 113 and 115 to illuminate, respectively, the photoelectric cells 103 and 105. It will be understood that the enclosure 107 may have an air-tight seal with the container 55 and may be evacuated by the pumping system employed for the container 55. It will be understood further that all connections to parts positioned within the evacuated container and enclosures are passed through the container and enclosures by means of air-tight seals.

Passage of light from the light source 109 through the openings 113 and 115 is controlled by a shutter, which is responsive to rotation of the drum 43. Conveniently, the shutter may be formed by the rim of the drum 43 which has a slot or notch 117 formed therein. By inspection of Fig. 1, it will be observed that each of the photoelectric cells 103 and 105 is illuminated once for each rotation of the drum 43.

The position of the arm 119d determines by what means a voltage potential is applied to the anode of the photoelectric cell 103. If the arm 119d is positioned to contact terminal 119a, the photoelectric cell 103 is rendered conductive whenever the slot 117 on the revolving drum 43 reaches a position which permits light from the lamp or bulb 109 to pass through the slot 117, and the opening 113, to fall upon the photoelectric cell 103 and to affect its conductivity. The current that is permitted to flow through the photoelectric cell 103 reduces the bias on the electrical discharge device 59 and causes it to be conductive for the purpose of initiating a recording.

If the arm is positioned to contact the terminal 119c and a circuit between leads 125 and 127 is periodically opened and closed, current will not flow between the anode and cathode of the photoelectric cell 103 except at an instant when two conditions simultaneously occur. The first condition is that the circuit between the leads 125 and 127 is closed. The second condition is that the slot 117 is momentarily at a position which permits light from the bulb 109 to fall upon the photoelectric cell 103.

If the arm 119d is positioned to contact terminal 119b, voltage is applied to photoelectric cell 103 from a peaking transformer 121. As well known in the art, a peaking transformer has a saturable core and produces a positive peak voltage and a negative peak voltage during each cycle, each peak voltage being of a very short duration which is only a fraction of a half cycle. A negative peak voltage applied to the photoelectric cell 103, when the photoelectric cell 103 is conductive, would not reduce the bias on the electrical discharge device 59 and cause an initiation of a recording. However, a positive peak voltage in such case would reduce the bias and cause the electrical discharge device 59 to be conductive. To cause the electrical discharge device 59 to be conductive, light from the bulb 109 must fall upon the photoelectric cell 103 when a positive voltage pulse is applied to the photoelectric cell 103. The photoelectric cell 103 is conductive only when the lamp or bulb 109, the slot 117 and the opening 113 are in alignment to permit light to fall upon the photoelectric cell 103. If a positive peak voltage is applied to the photoelectric cell 103 when the photoelectric cell is conductive, the positive peak voltage, when applied to the control electrode 59b, reduces the bias and causes the electrical discharge device 59 to be conductive to initiate a recording. Since the positive peak voltage in the secondary of the peaking transformer 121 has a definite relation to the positive half cycle of voltage between the lines L1 and L2, the recording may be initiated at a very precise time in relation to any half cycle of the voltage between lines L1 and L2. By changing the position of the reversing switch 124, the initiation is shifted 180° from the former phase angle.

It is to be observed that the drum 43 may for instance be rotating about 3500 revolutions per minute and a positive voltage applied to the photoelectric cell 103, such as by the peaking transformer 121, sixty times per second. Several seconds may transpire before the slot 117 is in position to permit light to fall upon the photoelectric cell 103 at the instant that a positive voltage pulse from the peaking transformer 121 is applied to the photoelectric cell 103. The speed of the drum 43 can be selected to permit, after a reasonable number of revolutions of the drum 43, the coincidence of a voltage pulse applied to the photoelectric cell 103 and an illumination of the photoelectric cell 103, to reduce the bias on the electrical discharge device 59 and to cause it to be conductive for the purpose of initiating a recording, such recording being initiated at a definite determinable precise time with reference to the referential voltage pulse.

It is frequently advantageous to employ the electronic control system 57 to initiate a phenomenon to be recorded, such as a transient phenomenon, and such initiation may be accomplished by the use of a tripping control 139 and a surge generator set 141. The tripping control 139 comprises an electronic tube 143, a thyratron, having an anode 143a, a grid or control electrode 143b and a cathode 143c, the anode and cathode being main electrodes defining a path or space for current which is controlled by the control electrode 143b. The cathode 143c is connected by a conductor 144 to an adjustable tap 145 on a potentiometer or voltage divider 147. A source of potential, such as a battery 149, is connected across the terminals of the voltage divider 147, the negative terminals of the voltage divider 147 and battery 149 being grounded. The anode 143a is connected through the primary of a transformer 151 and a resistor 153 to the positive terminal of the voltage divided 147. A capacitor 155 is connected between the conductor 144 and a point common to the resistor 153 and the primary winding of the transformer 151. The grid 143b is connected through a resistor 156, the secondary winding of a peaking transformer 157 and a conductor 158, to the conductor 63. The primary winding of the peaking transformer 157 is connected through a reversing switch 154 across the conductors L1 and L2 which are a source of sixty-cycle alternating current. The secondary winding of the transformer 151 has one terminal grounded and the other terminal connected through a resistor 159 to the center electrode 161b of an auxiliary triple gap 161, which has electrode 161c grounded and electrode 161a connected to the surge generator set 141.

The surge set may be of any of the conventional types, and for purposes of illustration, a surge set is disclosed comprising a group of resistors and a group of capacitors interconnected by spark gaps so that the capacitors are charged in parallel through the resistors and are discharged in series through the spark gaps. Referring to the drawing, the surge set 141 comprises a transformer 165 having its primary winding connected across the conductors L1 and L2 and having one terminal of its secondary winding connected to a conductor common to the anode of a half-wave rectifier 167 and to the cathode of half-wave rectifier 169, and having the other terminal of the secondary winding connected through a resistor 171 to a conductor 173. The conductor 173 is connected to the cathode of the rectifier 167 through a capacitor 175 and a terminal 179, and is connected to the anode of the rectifier 169 through a capacitor 177 and a terminal 197. In series with the cathode of the rectifier 167 are the terminal 179, a resistor 181, a terminal 183, a resistor 185, a terminal 187, a resistor 189, a terminal 191, a resistor 193, and a terminal 195. Similarly, in series with the anode of the rectifier 169 are the terminal 197, a resistor 199, a terminal 201, a resistor 203, a terminal 205, a resistor 207, a terminal 209, a resistor 211 and a terminal 213. Between terminals 183 and 201, 187 and 205, 191 and 209, 195 and 213 are capacitors 215, 217, 219 and 221, respectively. A triple electrode gap 223 is connected between the terminals 179 and 201. Between the terminals 183 and 205, 187 and 209, and 191 and 213, are gaps 225, 227 and 229, respectively, of the two electrode type. Additional capacitors, resistors and spark gaps may be employed in the surge generator 141 and similarly connected to increase the number of spark gaps and capacitors in series when the set discharges.

The terminal 197 is grounded and the terminal 195 is connected through a spark gap 231, a test piece, which in this case may be a lightning arrester 233, and a resistor 235 for current measurement to ground. A voltage which may be between 3000 and 15,000 volts, is applied between the line terminal of the lightning arrester 233 and ground, by means of a transformer 237, having its secondary winding connected to the line terminal of the lightning arrester 233 and ground, and having its primary winding connected through a circuit breaker 239 to a voltage supply such as a sixty-cycle alternating-current generator 241. The generator 241 by means of a step-down transformer 259 supplies 110 volts to the lines L1 and L2.

An impedance 243 comprising capacitance and resistance in series is connected between ground and the line side of the lightning arrester 233. The impedance 243 is illustrated as a voltage divider with an intermediate tap 261 and as having a capacitor 263 and a resistor 265 connected between the tap 261 and ground, and having a resistor 267 and a capacitor 269 connected between the tap 261 and the line side of the lightning arrester 233. The tap 261 is connected to terminal 271e of a selective switch 271 by means of a shielded conductor 273. The selective switch 271 has a movable arm 271d connected by means of a conductor 14 to the one of the deflecting plates 13, which is not grounded, and has terminals 271x and 271i as well as the terminal 271e. To facilitate recording current values, the terminal 271i is connected by means of a shielded conductor 275 to a conductor common to the lightning arrester 233 and the resistor 235.

The center electrode of the triple gap 223 is connected to ground through a conductor 249 and a resistor 253. The electrode 161a of the auxiliary triple gap 161 is connected to the conductor 173. A capacitor 251 is connected between the electrode 161a of the auxiliary triple gap 161 and the conductor 249.

When the transformer 165 is energized, the half-wave rectifiers 167 and 169 cause a direct current to be applied across all the capacitors in the surge generator set 141 including the capacitor 251. This direct current causes each of the capacitors to become charged.

As is well understood in the art, impedances and voltages and tube characteristics employed in electronic circuits may be varied appreciably. As a specific example, however, satisfactory operation of the electronic control system 57 and the tripping control 139 may be obtained by employing for tubes 59, 61 and 143 a type of tube known as KV627, described on pages 5–42 of the Electrical Engineers Handbook by Pender and McIlvain. The resistors 69 and 79 may have a resistance value in the order of 100,000 ohms, the resistor 65 in the order of 10,000 ohms, and the resistors 95, 101 and 137 in the order of 3 megohms. The capacitor 67 may have a capacitance of .01 microfarad and the blocking capacitor 131 a capacitance of one microfarad. Improved performance may be obtained by adding resistance in the order of 10,000 ohms in the conductors 93 and 99 associated with the grids of tubes 59 and 61 respectively.

It is believed that the operation of the system illustrated in Fig. 1 now may be set forth. If a record is to be taken of a multiple cylinder aircraft internal combustion engine, the engine is grounded and the ignition voltages are applied to one of the deflecting plates 13 by means of a lead connected to the terminal 271x of the selective switch 271 which has its arm 271d positioned to contact the terminal 271x. The leads 125 and 127 are connected to the engine so that, when voltage is applied to the spark plug of one of the cylinders of the engine such as the spark plug of number one cylinder, a circuit is closed between the leads 125 and 127 and a voltage is impressed upon the photocell 103, the arm 119d of the switch 119 being positioned to contact terminal 119c.

It will be noted that removable doors 281 and 283 are illustrated in Fig. 1 to provide access to the drum 43 and to the photoelectric cells 103 and 105. These doors when in mounting position complete a substantially airtight seal for the container 55. The container 55 next is evacuated by means of a suitable pumping system, such as that illustrated in the aforesaid Ackermann patent. As representative of suitable pressures within the container, the pressure within the electron gun 3 may be in the order of 10 microns of mercury, whereas the pressure within the remainder of the container 55 may be of the order of two microns of mercury.

The high voltage source 23 is connected between the cathode 15 and the anode 17 to produce an electron beam directed along the axis of the container 55. The pressure within the electron gun 3 and the voltage of the source 23 may be varied appreciably. However, with a pressure in the order of 10 microns, a voltage of 50,000 volts may be applied between the cathode 15 and the anode 17.

Since the electron beam travels along the axis of the container 55, it impinges upon the target 5 and does not reach the photosensitive surface 7. In order to bend the electron beam around the target 5, the relay 9 must be energized with a voltage which may be in the order of 900 volts. This voltage is obtained by having the terminals of the relay 9 connected through resistors 245 and 247 to the anodes 59a and 61a, respectively, of the electronic tubes, and to the plate resistors 69 and 79, respectively. However, such voltage is not applied to the relay 9 until the switch 73 is actuated to close the contacts. It will be understood further that the motor 49 is energized to rotate the drum 43 continuously. The rate of rotation of the motor is controlled by means of the rheostat 53, and the rate of rotation may be determined by any suitable manner such as a frequency meter connected in the three-phase circuit between the inverter 51 and the motor 49. In addition, the light source 109 is illuminated by connecting it to the battery 111. With the system as thus described in operation the photocells 103 and 105 are illuminated during each revolution of the drum 43, but such illumination of the photoelectric cells does not initiate discharges in the electronic tubes 59 and 61 for the reason that the switch 73 is open and no plate voltage is applied therethrough to the electronic tubes. Since the plates of the relay 9 are connected by the resistors 245, 69, 79 and 247, they are at substantially the same potential, the path of travel of the electron beam being along the axis of the container and being blocked by the target 5.

To produce a record on the recording surface 7, the switch 73 is actuated to close its contacts. Such actuation of the switch of itself does not affect the path of travel of the electron beam for the reason that as long as no discharge occurs in either the electronic tube 59 or 61, all plates of the relay 9 are at the same potential with respect to ground.

As the drum 43 rotates, the notch 117 moves into alignment with the opening 115 to illuminate the photocell 105 and to cause the photocell to become conductive. There is no difference in voltage across photocell 105 and no current flows since the biasing voltage between the tap 87 and the negative terminal of voltage divider 83 is applied through resistor 101 to the grid 61b. The voltage on the grid 61b is substantially unchanged when the photoelectric cell 105 is conductive and a discharge is not initiated in the tube 61 before a discharge is initiated in the tube 59.

As the drum 43 continues to rotate, the notch 117 moves into alignment with the opening 113 to illuminate the photocell 103 and to cause the photocell 103 to be conductive. Since the lead 125 or 127 is connected to the engine, such as to a commutator on its shaft, or, preferably, to its electrical distributor, and the other lead is grounded on the engine, the electrical circuit between the leads 125 and 127 is closed only each time the selected cylinder, such as number one cylinder, is being fired. By having the drum 43 rotate at a slightly different speed with reference to the speed of the engine, within a reasonable number of revolutions after the contacts of switch 73 are closed, the closing of the circuit between leads 125 and 127 will be synchronized for a brief instant with the illumination of the photocell 103. At this brief instant, a positive potential from the battery 85 causes the grid 59b to become less negative with respect to the cathode 59c of the electronic tube 59.

At this brief instant, a discharge is initiated in tube 59 and the plate current flows through the tube through a circuit which may be traced from ground through the battery 77 which may supply 1000 volts, the resistor 75, the switch 73, the conductor 71 and the plate resistor 69, the main electrodes 59a and 59c of the electronic tube 59, the conductor 63, and the resistor 65 to ground. The plate current in flowing through the plate resistor 69 produces a voltage drop thereacross which may be of the order of 900 volts. Consequently, this voltage is applied to the terminals of the relay 9 to bend the electron beam around the target 5. The electron beam passes through the opening in the diaphragm 11 and is deflected by the plates 13 in accordance with the voltage applied to the plates. The voltage in this case is the ignition applied to the respective cylinders of an internal combustion engine (not shown).

The deflected beam passes through the opening in the masking plate 39 and produces a record on the recording surface 7. It will be noted that the slot 117 is so located that it illuminates the photocell 103 immediately after the bar 45 passes the opening in the masking plate 39. Consequently, the record on the recording surface 7 is initiated adjacent the leading edge of the recording surface 7. The recording is also initiated at the time a certain cylinder of the engine is fired so that time relationships are definitely established.

After a discharge is initiated by the grid 59b in the electronic tube 59, the grid loses control of the discharge, since the electronic tube 59 is a gas tube, and current continues to flow between the main electrodes of the tube. Consequently, the relay 9 continues to bend the electron beam around the target 5 and the beam continues to strike or impinge upon the recording surface 7 and to produce a trace or record thereon.

As the drum 43 continues its rotation, the slot 117 again comes into alignment with the opening 115 to permit illumination of the photoelectric cell 105 by the light source 109. Such illumination of the photoelectric cell 105 results in an initiation of a discharge in the electronic tube 61. This action may be explained by reference to Fig. 1. It will be noted that when a discharge is initiated in the electronic tube 59, the discharge current flows through the cathode resistor 65.

It will be recalled that the photoelectric cell 105 is connected between the grid 61b of the electrical discharge device 61 and the cathode 59c of the electrical discharge device 59, the circuit being traced from the grid 61b through the conductor 99, to the cathode of the photoelectric cell 105, and from the anode of the photoelectric cell 105 through the conductor 133, the blocking capacitor 131, and the conductor 63, to the cathode 59c of the electrical discharge device 59. A biasing voltage is applied between ground and the control electrode 61b of the tube 61, the circuit being traced from ground through the conductor 89 to the tap 87 on the voltage divider 83, through that portion of the voltage divider 83 between the tap 87 and the negative terminal of the voltage divider, and through resistor 101 and the conductor 99 to the control electrode 61b. It is to be observed that the biasing circuit for electronic tube 61 does not contain the load or cathode resistor 65 which is connected by means of the conductor 63 between the cathode 59c of electronic tube 59 and ground. However, when electronic tube 59 is discharging, current flowing through the cathode resistor 65 produces a voltage drop across the resistor 65 which causes a voltage to be impressed through the blocking capacitor 131 and the conductor 133 upon the anode of the photoelectric cell 105, and, when the cell is conductive, to be impressed upon the resistor 101 and, by means of the conductor 99, upon the grid 61b of the tube 61. The blocking capacitor 131 has a high impedance to a steady direct-current voltage and a low impedance to a transient voltage.

By employing the blocking capacitor 131 and the leak resistor 137, the bias voltage from that portion of the voltage divider 83 between its negative terminal and the tap 87 is eliminated since the bias voltage might otherwise furnish sufficient voltage to the photoelectric cell 105 to cause a discharge to occur in the tube 61 before a discharge is initiated in tube 59. The characteristics of the leak resistor 137 and the blocking capacitor 131 determine the duration of the transient voltage impressed upon the anode of the photocell 105 after a discharge is initiated in the tube 59.

It will be noted that the cathode of the photoelectric cell 105 is connected to the grid 61b of the electrical discharge tube 61 and when it is illuminated produces a low resistance path permitting the voltage resulting from the voltage drop across the resistor 65 to be applied to the grid 61b and to cause the grid 61b to become less negative, and thereby initiating a discharge in the tube 61.

When a discharge is initiated in the tube 61, plate current flows through the plate resistor 79 which is associated with the tube 61. This plate current produces a voltage across the resistor 79 which is almost equal to that across the resistor 69. Consequently, all plates of the relay 9 again are substantially the same potential with respect to ground and the electron beam in the oscillograph 1 returns to a path which impinges on the target 5. This effectively discontinues the formation of a record on the recording surface 7. By inspection of Fig. 1, it will be noted that the slot 117 is in alignment with the opening 115 when the bar 45 is about to pass under the opening in the masking plate 39. Consequently, the record formed on the recording surface 7 continues substantially to the end of the recording surface 7. The recording operation is effective for slightly less than one revolution of the drum 43.

Since the electronic tubes 59 and 61 are gaseous discharge tubes, the grids, after initiation of a discharge in the respective tubes, lose control of the discharge. Therefore, current continues to flow through both of the tubes 59 and 61 until the switch 73 is released to open its contacts. This restores the electronic control system 57 to its initial condition wherein no plate voltage is applied to the electronic tubes 59 and 61. If a subsequent record is desired, the switch 73 again is actuated to close its contacts. Such actuation initiates a repetition of the cycle of operation which has just been described. After the desired record or records have been produced on the recording surface 7, the cover 281 may be removed, and the recording surface 7 may be removed from the drum 43.

If the rate of rotation of the drum 43 is known, the length of time between any two points on a record formed on the recording surface 7 readily may be calibrated. Since the recording is initiated at a definite time interval with reference to the phenomenon to be recorded, the ignition of each of the cylinders can be readily identified on the recording. Without changing the speed of the drum, a timing wave may be produced by supplying to the terminal 271x of the selective switch, instead of the ignition voltages, a source having a known frequency of voltage alternation such as a sixty-cycle voltage produced by the alternating-current generator 241. By actuation of the switch 73, a second recording then may be formed on the recording surface. Since the alternating wave has a known frequency of alternation, it may be employed as a reference timing wave. After the timing wave has been recorded on the recording surface 7, both of the deflecting plates 13 may be grounded by connecting the terminal 271x to ground. The switch 73 is again actuated to record a zero line on the recording surface 7, which may also be employed for reference purposes. Since each of the component records is restricted to a single revolution of the drum 43, records are obtained which are free from confusing overlapping.

If, for a particular recording, it is not necessary to initiate the recording at a particular time interval, the arm 119d of the switch 119 may be moved to contact the terminal 119a.

In many cases such as when employing the surge set 141, it may be desirable to initiate a recording at a definite time with reference to a timed pulse such as a sixty-cycle pulse, in which case the switch 119 is operated so that its arm 119d contacts terminal 119b. When the arm 119b is in this position, a pulse produced by the peaking transformer 121 is applied to the anode of the photoelectric cell 103 instead of a voltage supplied by the voltage divider 83. By having the resistor 123 in series with the primary of the peaking transformer 121, a positive peak voltage is produced at the beginning of each cycle just as the applied voltage and current pass through zero.

If the switch 73 is closed, a discharge in tube 59 will be initiated upon the synchronization of a positive voltage pulse from the peaking transformer 121 and the illumination of photocell 103, which is thereby made conductive. It is recognized that the drum 43 may make several revolutions before such synchronization takes place. If the frequency of rotation of the drum 43 differs slightly from the frequency of the voltage pulse, synchronization will occur after a reasonable number of rotations of the drum 43. Upon the concurrence of a positive voltage pulse and the illumination of photocell 103, the positive voltage pulse is conducted by the photocell 103 which is conductive when illuminated, to the control electrode 59b. This voltage pulse causes the control electrode 59b which has had a negative bias voltage impressed thereon, to become less negative with respect to the cathode 59c. A discharge is thereby initiated in the associated tube 59. With the discharge of the tube 59, the electron beam is deflected by the relay 9 to pass the target 5 thereby permitting the beam to strike the recording surface 7 and to initiate the production of a trace on the recording surface 7.

In the tripping control 139, the control electrode 143b of the electrical discharge tube 143 is impressed with a negative biasing voltage with respect to its cathode 143c. The negative terminals of the battery 149 and the voltage divider 147 are grounded, the cathode to ground circuit being traced from the cathode 143c through the conductor 144, and through that portion of the voltage divider between the tap 145 and its negative terminal, to ground. The control electrode to ground circuit is traced from the control grid 143b through the resistor 156, the secondary of the peaking transformer 157, the conductor 158, and the cathode resistor or load 65 to ground. The voltage across that portion of the voltage divider between the tap 145 and its positive terminal causes the capacitor 155 to become charged.

When the tube 59 is discharging through the cathode resistor 65, the voltage drop in the resistor 65 resulting from the discharge current, makes the bias on the control electrode 143b less negative, but the voltage impressed upon the control electrode 143b because of the voltage drop is not sufficiently less negative as to cause a discharge to occur in the tube 143.

The peaking transformer 157 has the resistor 156 in series with its secondary winding. By having the primary circuit highly inductive so that the voltage and current will be nearly 90° out of phase, a positive peaked voltage is produced by the peaking transformer 157, which has approximately a 90° time lag with respect to the positive peaked voltage produced by the peaking transformer 121. This time lag is a matter of design and is a constant which can be readily and accurately determined. If desired, the constant can be changed for any particular recording by changing the impedance characteristics of the primary circuits of the peaking transformers 121 and 157.

A discharge occurs in tube 59 at the time a positive voltage pulse is produced by the peaking transformer 121 and the drum 43 is in position to allow light from the lamp 109 to illuminate the photocell 103. The discharge current from the tube 59 flowing through the load or resistor 65 reduces the bias on the control electrode 143b so that, when a positive peaked voltage is produced by the peaking transformer 157, the voltage impressed upon the control electrode 143b is sufficiently less negative so that the tube 143 is conductive. When the tube 143 is conductive, the capacitor 155 discharges and a current flows through the tube 143 and the primary of transformer 151 causing a current to be induced in the secondary of the transformer 151, to flow through the resistor 159, and to jump from the electrode 161b to the electrode 161a of the auxiliary triple gap 161. This causes the triple gap 161 to break down and permits capacitor 251 to discharge through the auxiliary triple gap 161 and the resistor 253 to ground. At the same time, a discharge is initiated in the triple gap 223 by a similar sequence. The resistors 159 and 156 limit the back-feed from the surge generator 141 which might otherwise cause the tube 61 to prematurely fire and terminate the recording.

It is to be pointed out that, as is well understood in the art, the capacitors 175, 177, 215, 217, 219 and 221 are charged by the half-wave rectifiers 167 and 169. With the initiation of a discharge in the triple gap 223, the capacitors are discharged in series through the test piece or lightning arrester 233, the circuit being traced from ground through the terminal 197, the capacitor 177, the conductor 173, the capacitor 175, the terminal 179, the triple gap 223, the terminal 201, the capacitor 215, the terminal 183, the gap 225, the terminal 205, the capacitor 217, the terminal 187, the gap 227, the terminal 209, the capacitor 219, the terminal 191, the gap 229, the terminal 213, the capacitor 221, the terminal 195, the two-electrode gap 231, the lightning arrester 233, and the resistor 235, back to ground.

By means of the sixty-cycle alternating-current generator 241, a voltage is applied through the circuit breaker 239 to the primary of the transformer 237 having its secondary connected between the line terminal of the lightning arrester 233 and ground. In order to record the voltages of the transient phenomenon produced in the secondary circuit of the transformer 237, the arm 271d of the selective switch 271 is moved to contact terminal 271e, if voltage values are to be recorded, or to contact terminal 271i if current values are to be recorded. In order to minimize the effects of stray fields, the shielding on each of the conductors 273 and 275 is grounded.

A typical record produced on a recording surface 7 is illustrated in Fig. 2. In Fig. 2, the recording surface 7 is shown with four records A, B, C and D formed thereon. To facilitate distinguishing record B from record D, record B is illustrated by dotted lines although the trace actually is in full lines on the recording surface 7.

Record A is a reference line formed by closing the contacts of the switch 73 after positioning the arm of the switch 271 to contact terminal 271x and connecting the terminal 271x to ground. Record B is a portion of a sine wave, illustrated by a dotted line, obtained by applying an alternating-current voltage from the generator 241 to the terminal 271x of the switch 271 and again activating the switch 73.

To obtain record C, representing voltage values at the time a transient phenomenon occurs on a positive voltage crest, an alternating current is applied across the lightning arrester by means of the generator 241, the arm 271d of the switch 271 being positioned to contact terminal 271e.

To produce a transient phenomenon, the surge set 141 is discharged on the positive sixty-cycle crest by means of the tripping control 139 and the electronic control system 57.

To obtain record D representing voltage values at the time a transient phenomenon occurs on a negative voltage crest, the electronic control system 57 is again energized by closing the contacts of the switch 73 after reversing the positions of the reversing switches 124 and 154, respectively, to initiate the recording at the beginning of a negative half-cycle across the lines L1 and L2 and produce a transient phenomenon by discharging the surge set 141 during the negative half-cycle.

By positioning the reversing switch 124 so that a positive peaked voltage is produced in the secondary of the peaking transformer 121 at the beginning of a half-cycle of one polarity across the lines L1 and L2, and by positioning the reversing switch 154 so that a positive peaked voltage is produced in the secondary of the peaking transformer 157 during a half-cycle across the lines L1 and L2 of a polarity opposite to the first-mentioned polarity across the lines L1 and L2, the initiation of a recording occurs at the beginning of a first half-cycle of one polarity and the phenomenon occurs in a second half-cycle of opposite polarity.

It will be observed with respect to records B, C and D, that the initiation of each recording takes place at the instant the voltage and current pass through zero in the alternating-current cycle, and that the transient phenomenon in each of the recordings C and D takes place at a particular time after the initiation of the recording.

By positioning the arm 271d of the selective switch 271 to contact the terminal 271i and repeating the operation of the system, for producing records C and D, comparable recordings representing current values on positive and negative crests, respectively, instead of voltage values, may be recorded.

Following the formation of the records A, B, C and D, recording surface 7 may be removed from the drum 43 and developed to produce a composite record showing curves similar to those illustrated in Fig. 2, the arrow representing the direction in which the recording surface 7 is moving during each of the recordings. Each of the component records is restricted to a single revolution of the drum 43. Since each transient phenomenon, with respect to records C and D, is initiated at a definite time after the initiation of the recording, comparisons may be readily made and time relationships determined as to the effects of each transient phenomenon.

Although the invention has been described with reference to certain specific embodiments thereof, numerous modifications are possible. Therefore, the appended claims have been drafted to cover not only the specific embodiments herein disclosed, but also all other embodiments falling within the spirit and scope of the invention.

I claim as my invention:

1. In an electronic device, a pair of gaseous discharge tubes, each including a pair of main electrodes and a control electrode suitable when the tube is energized for initiating a discharge between the main electrodes, means responsive to a discharge in each of the tubes for performing a separate control action, means associated with the control electrode of a first one of the tubes for initiating under a predetermined condition a discharge in the associated tube, biasing means comprising an electrical circuit for applying to the control electrode of a second one of the tubes a potential that normally renders the associated tube non-conductive, an impedance in a circuit connecting the main electrodes of the first one of the tubes and in parallel with said biasing means, for conditioning the second one of the tubes for initiation of a discharge therein upon discharge of the first one of the tubes, initiating means comprising an electrical circuit for initiating under a predetermined condition a discharge in the associated tube when the second one of the tubes is conditioned for initiation of a discharge therein.

2. In an electronic device, a pair of gaseous discharge tubes, each including a pair of main electrodes and a control electrode suitable when the tube is energized for initiating a discharge between the main electrodes, means responsive to a discharge in each of the tubes for performing a separate control action, means associated with the control electrode of a first one of the tubes for initiating under a predetermined condition a discharge in the associated tube, biasing means comprising an electrical circuit associated with the control electrode of a second one of the tubes for applying a potential that normally renders the second one of the tubes non-conductive, an activating circuit in parallel with said biasing means, said activating circuit comprising electrical conditioning means and electrical initiating means, electrical conditioning means being responsive to a discharge in the first one of the tubes for conditioning the second one of the tubes for initiation of a discharge therein and said electrical initiating means initiating under a predetermining condition a discharge in the second one of the tubes when the second one of the tubes is conditioned for initiation of a discharge therein.

3. An electronic device as claimed in claim 2, characterized by the fact that the activating circuit is associated with a main electrode of the first one of the tubes.

4. In an electronic recording device capable of recording a phenomenon having a movable supporting surface for a recording medium, a pair of gaseous discharge tubes, means responsive to a predetermined position of the movable supporting surface for initiating a discharge in a first one of the tubes, initiating means comprising an electrical circuit responsive to a discharge of the first one of the tubes for initiating the production of a trace upon a recording medium on the supporting surface and for initiating the phenomenon to be recorded, means responsive to a predetermined movement of the supporting surface for initiating a discharge in a second one of the tubes, and means responsive to the discharge of the second one of the tubes for terminating the production of a trace upon a recording medium on the supporting surface.

5. An electronic device as claimed in claim 4, wherein the initiation of the phenomenon and the initiation of the recording are in a determinable time-relationship to each other.

6. In an electronic recording device having a movable supporting surface for a recording medium upon which a trace may be produced after the electronic recording device is subjected to a referential voltage pulse, a pair of gaseous discharge tubes, each including an anode, a cathode and a control electrode suitable when the tube is energized for initiating a discharge between the anode and cathode, electrical initiating means comprising an electrical circuit controlling the energization of the control electrode of a first one of the tubes for initiating upon the synchronization of a referential voltage pulse applied to the electrical circuit and a predetermined position of the movable supporting surface, a discharge in the associated tube to initiate the production of a trace upon a recording medium on the movable supporting surface, means responsive to a predetermined movement of the movable supporting surface for producing a discharge in a second one of the tubes, and means responsive to a discharge in the second one of the tubes for terminating the production of a trace upon a recording medium on the movable supporting surface.

7. In a recording device having a movable supporting surface for a recording medium upon which a trace may be produced after the electronic recording device is subjected to a referential voltage pulse, means for directing a recording beam toward said movable supporting surface, barrier means in the path of said beam for preventing the beam from arriving at a recording medium on said supporting surface, means for moving said movable supporting surface relative to said beam, controlling means when suitably activated for permitting said beam to pass said barrier means, electrical activating means responsive to the concurrence of a referential voltage pulse applied to said electrical circuit and a predetermined position of said movable supporting surface for activating the controlling means to initiate the production of a trace upon a recording medium on said movable supporting surface, and means responsive to a predetermined movement of said movable supporting surface for terminating production of a trace upon a recording medium on said movable supporting surface.

8. A recording device, as claimed in claim 7, wherein a phenomenon to be recorded is initiated in a determinable time-relationship to the referential voltage pulse.

9. In an electronic device, a first and second gaseous discharge tube, each including a pair of main electrodes and a control electrode suitable when the tube is energized for initiating a discharge between the main electrodes, biasing means comprising an electrical circuit associated with the control electrode of each tube for normally rendering the tube non-conductive, electrical control means responsive to a discharge in each of the tubes for performing a separate control action, electrical initiating means for initiating a discharge in the first tube in response to a predetermined condition, an impedance through which current flows to produce a voltage thereacross, upon a discharge in the first tube, a second electrical initiating means for permitting under a predetermined condition the voltage to be impressed upon the control electrode of the second tube to initiate a discharge therein, said impedance being in parallel with the biasing means associated with the control electrode of the second tube.

10. In an electronic device, a first and second gaseous discharge tube, each including a pair of main electrodes and a control electrode suitable when the tube is energized for initiating a discharge between the main electrodes, biasing means associated with the control electrode of each tube for normally rendering the tube non-conductive, means responsive to a discharge in each of the tubes for performing a separate control action, electrical initiating means for initiating a discharge in the first tube in response to a predetermined condition, an impedance through which current flows to produce a voltage thereacross, upon a discharge in the first tube, a second electrical initiating means for permitting under a predetermined condition the voltage to be impressed upon the control electrode of the second tube to initiate a discharge therein, said biasing means being common to the control electrodes of the first and second tubes.

11. In a recording device having a supporting surface for a recording medium, means for moving said supporting surface relative to said device, electrical initiating means comprising an electrical circuit for initiating a trace upon a recording medium on the supporting surface upon the coincidence of a predetermined position of said supporting surface and a determinable instantaneity, and means for terminating the production of the trace after a predetermined movement of said supporting surface.

12. In a recording device as claimed in claim 11, wherein a phenomenon to be traced upon a recording medium on the supporting surface is initiated in a determinable time relationship to the initiation of a trace upon said recording medium.

13. In a recording device as claimed in claim 11, wherein a phenomenon to be traced upon a recording medium on the supporting surface is initiated in a determinable time relationship to the instantaneity.

14. In an electronic recording device capable of being subjected to periodic voltage pulses and having a movable supporting surface for a recording medium, a pair of gaseous discharge tubes, each including an anode, a cathode and a control electrode suitable when the tube is energized for initiating a discharge between the anode and cathode, electrical initiating means comprising an electrical circuit controlling the energization of the control electrode of a first one of the tubes for initiating upon the synchronization of a first periodic voltage pulse applied to the electrical circuit and a predetermined position of the movable supporting surface, a discharge of the associated tube, means responsive to a discharge of the first one of the tubes for starting the production of a trace upon a recording medium on the supporting surface, a second electrical initiating means responsive to a discharge of the first one of the discharge devices and a second periodic voltage pulse in timed relation to the first periodic voltage pulse applied to a second electrical circuit for initiating a phenomenon to be traced on a recording medium on the supporting surface, means responsive to a predetermined movement of said supporting surface for producing a discharge in a second one of the tubes, means responsive to the discharge of the second one of the tubes for terminating the production of a trace upon a recording medium on the supporting surface.

ALERT M. OPSAHL.

REFERENCES CITED

The following references are of record in the file of this patent:

UNITED STATES PATENTS

| Number | Name | Date |
|---|---|---|
| 1,779,794 | Ackermann | Oct. 28, 1930 |